United States Patent
Gobert et al.

(10) Patent No.: US 7,937,942 B2
(45) Date of Patent: May 10, 2011

(54) TURBOCHANGER SYSTEM FOR INTERNAL COMBUSTION ENGINE COMPRISING TWO COMPRESSOR STAGES OF THE RADIAL TYPE PROVIDED WITH COMPRESSOR WHEELS HAVING BACKSWEPT BLADES

(75) Inventors: Ulrich Gobert, Hisings-Karra (SE); Lars Sundin, Malmö (SE); Magnus Ising, Lund (SE); Daniel Grunditz, Ojersjö (SE); Per Andersson, Malmö (SE); Kent Giselmo, Vellinge (SE); Sebastian Krausche, Höllviken (SE)

(73) Assignee: Volvo Lastvagnar AB, Gothenburg (SE)

( * ) Notice: Subject to any disclaimer, the term of this patent is extended or adjusted under 35 U.S.C. 154(b) by 662 days.

(21) Appl. No.: 11/164,241

(22) Filed: Nov. 15, 2005

(65) Prior Publication Data
US 2006/0123787 A1    Jun. 15, 2006

Related U.S. Application Data

(63) Continuation of application No. PCT/SE2004/000715, filed on May 11, 2004.

(30) Foreign Application Priority Data

May 15, 2003   (SE) ...................... 0301412

(51) Int. Cl.
 F02B 33/44   (2006.01)
 F02B 37/013  (2006.01)
 F04D 29/30   (2006.01)
 F04D 29/44   (2006.01)
 F04D 29/54   (2006.01)

(52) U.S. Cl. ................ 60/612; 415/199.2; 415/199.3; 415/211.1; 415/206

(58) Field of Classification Search ............ 123/559.1; 415/199.2, 199.3, 211.1, 205–206, 211.2; 416/241 R, 241 A; 60/612, 605.2; 417/42
See application file for complete search history.

(56) References Cited

U.S. PATENT DOCUMENTS
2,759,662 A * 8/1956 Carrier ................. 415/199.2
(Continued)

FOREIGN PATENT DOCUMENTS
EP  1275832 A2 * 1/2003
(Continued)

OTHER PUBLICATIONS
A translation of EP1275832 A.*
(Continued)

*Primary Examiner* — Thai Ba Trieu
(74) *Attorney, Agent, or Firm* — Novak Druce + Quigg LLP

(57) ABSTRACT

A turbocharger system for an internal combustion engine having at least one exhaust line for evacuating exhaust gases from the combustion chamber of the engine and at least on inlet line for supplying air to the combustion chamber. A high-pressure turbine interacts with a high-pressure compressor and a low-pressure turbine interacts with a low-pressure compressor to extract energy from the exhaust flow of the engine and pressurize the inlet air of the engine. Both compressor stages are of the radial type and are provided with compressor wheels having backswept blades, in which a blade angle between an imaginary extension of the blade along the centerline between root section and tip section in the direction of the outlet tangent and a line connecting the center axis of the compressor wheel to the outer point of the blade, is at least about 40 degrees.

11 Claims, 2 Drawing Sheets

U.S. PATENT DOCUMENTS

| | | | | |
|---|---|---|---|---|
| 3,226,085 A | * | 12/1965 | Bachl | 415/199.3 |
| 3,292,364 A | * | 12/1966 | Cazier | 415/205 |
| 3,552,877 A | * | 1/1971 | Christ et al. | 415/211.2 |
| 3,941,104 A | * | 3/1976 | Egli | 60/612 |
| 4,032,262 A | * | 6/1977 | Zehnder | 60/612 |
| 4,815,935 A | * | 3/1989 | Gottemoller | 415/211.1 |
| 5,145,317 A | * | 9/1992 | Brasz | 415/206 |
| 5,639,217 A | * | 6/1997 | Ohtsuki et al. | 416/183 |
| 5,924,847 A | * | 7/1999 | Scaringe et al. | 417/42 |
| 6,062,819 A | * | 5/2000 | Zangeneh et al. | 416/188 |
| 6,279,550 B1 | * | 8/2001 | Bryant | 123/559.1 |
| 6,484,500 B1 | * | 11/2002 | Coleman et al. | 60/612 |
| 6,553,763 B1 | * | 4/2003 | Callas et al. | 416/241 R |
| 6,883,314 B2 | * | 4/2005 | Callas et al. | 60/612 |
| 6,973,787 B2 | * | 12/2005 | Klingel | 60/612 |
| 6,981,370 B2 | * | 1/2006 | Opris et al. | 60/311 |
| 2006/0067829 A1 | * | 3/2006 | Vrbas et al. | 416/223 R |

FOREIGN PATENT DOCUMENTS

| | | | |
|---|---|---|---|
| FR | 2 282 058 | * | 3/1976 |
| GB | 148172 | * | 3/1976 |
| JP | 2005233188 A | * | 9/2005 |

OTHER PUBLICATIONS

A translation of EP 1 275832 A, published on Jan. 15, 2003.*

* cited by examiner

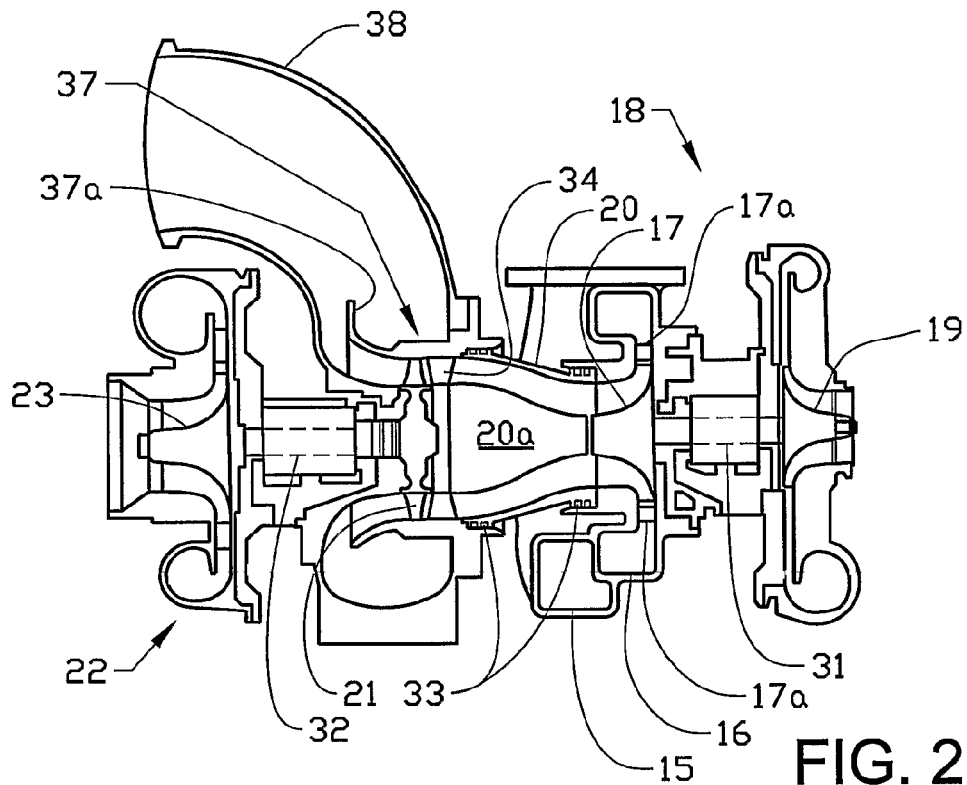
FIG. 2
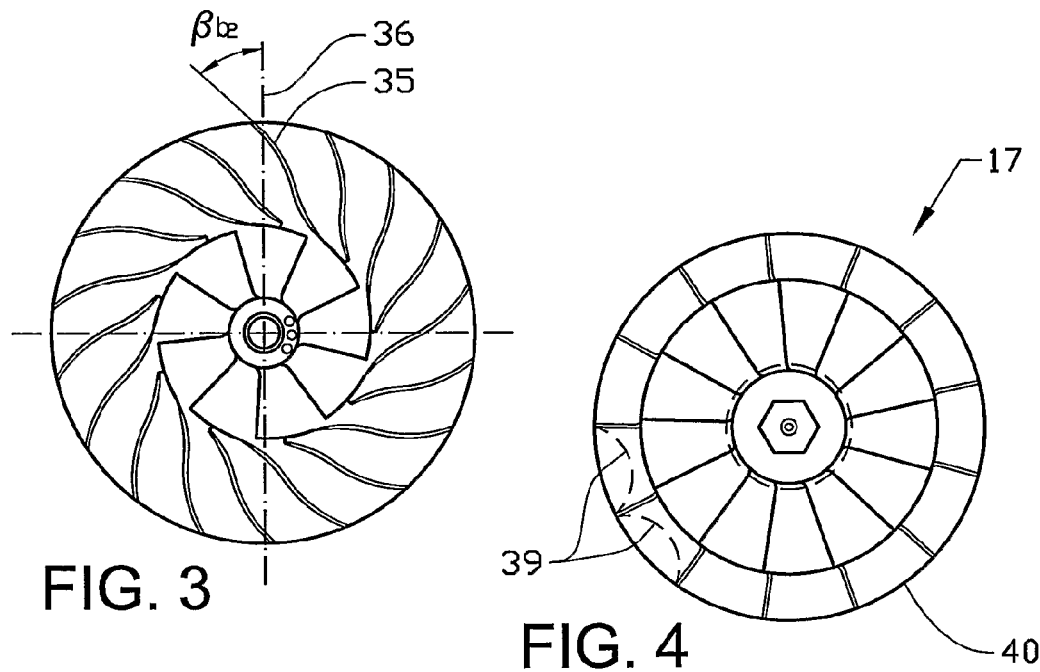
FIG. 3
FIG. 4

US 7,937,942 B2

TURBOCHANGER SYSTEM FOR INTERNAL COMBUSTION ENGINE COMPRISING TWO COMPRESSOR STAGES OF THE RADIAL TYPE PROVIDED WITH COMPRESSOR WHEELS HAVING BACKSWEPT BLADES

FIELD OF THE INVENTION

The present application is a continuation of International Application No. PCT/SE2004/000715, filed May 11, 2004, which claims priority to Swedish Application SE 0301412-3, filed May 15, 2003. Applicants claim the priority benefit of both earlier applications.

The present invention relates to a turbocharger system for an internal combustion engine having at least one exhaust line for evacuating exhaust gases from the combustion chamber of the engine and at least one inlet line for supplying air to the combustion chamber. A high-pressure turbine, interacting with a high-pressure compressor, and a low-pressure turbine, interacting with a low-pressure compressor, are also included for extracting energy from the exhaust flow of the engine and pressurizing the inlet air of the engine.

BACKGROUND OF THE INVENTION

Turbocharger systems for supercharging diesel-type internal combustion engines, preferably for heavy-duty vehicles, usually include a single-stage compressor driven by a single-stage turbine, both of the radial type. Turbocharger systems with two-stage supercharge sometimes also include intermediate cooling, but the construction is usually based on standard assemblies intended for single-stage supercharging.

Superchargers suitable for a diesel engine of 6 to 20 liters cubic capacity normally have an efficiency, under stationary conditions, of between 50% and 60% ($\eta_{compressor} * \eta_{mechanical} * \eta_{turbine}$). In contemporary diesel engines, the efficiency benefit is lower than for future engines, which will require higher charging pressure. Examples of systems which raise the supercharging requirement are exhaust gas recirculation for lower nitrogen oxide emissions or systems offering variable control of inlet valves.

Turbocharger systems with higher efficiency than 60%, under stationary conditions, offer a greater prospect of meeting future demands for environmentally friendly and fuel-efficient engines. Until now, environmental demands upon diesel engines have usually led to worsened efficiency, which has therefore meant that the energy resource of the fuel has not been well utilized.

SUMMARY OF THE INVENTION

One object of the present invention is therefore to produce an economically feasible turbocharger system which makes better use of the energy in the exhaust flow of the engine, for increased efficiency, and without engendering significant spatial requirements.

A turbocharger system, configured in this way for an internal combustion engine exemplarily at least one exhaust line for evacuating exhaust gases from the combustion chamber of the engine and at least one inlet line for supplying air to said combustion chamber. A high-pressure turbine is included that interact with a high-pressure compressor, and a low-pressure turbine that interacts with a low-pressure compressor for extracting energy from the exhaust flow of the engine. Both compressor stages are of the radial type and are provided with compressor wheels having backswept blades, in which the blade angle $\beta_{b2}$, between an imaginary extension of the centerline of the blade between root section and tip section in the direction of the outlet tangent and a line connecting the center axis of the compressor wheel to the outer point of the blade is at least about 40 degrees. Further, the high-pressure turbine is of the radial type and is connected to the low-pressure turbine by a short intermediate duct, and in that the low-pressure turbine is provided with inlet guide rails. This configuration of the turbocharger system allows an increase in the efficiency of the respective stages of the assembly to between 65% and 70%. This two-stage system thereby acquires an effective turbo efficiency in excess of 70%. Advantageous illustrative embodiments of the invention can be derived from the following independent patent claims.

BRIEF DESCRIPTION OF THE FIGURES

The invention will be described in greater detail below with reference to illustrative embodiments shown in the accompanying drawings, in which;

FIG. 2 is a longitudinal section through the two turbocharger stages forming the turbocharger system;

FIG. 3 shows, in partially broken plan view, a compressor wheel used in the turbocharger system according to the invention; and FIG. 4 shows, in plan view, the turbine wheel of the high-pressure turbine.

DESCRIPTION OF ILLUSTRATIVE EMBODIMENTS

Figure 1:
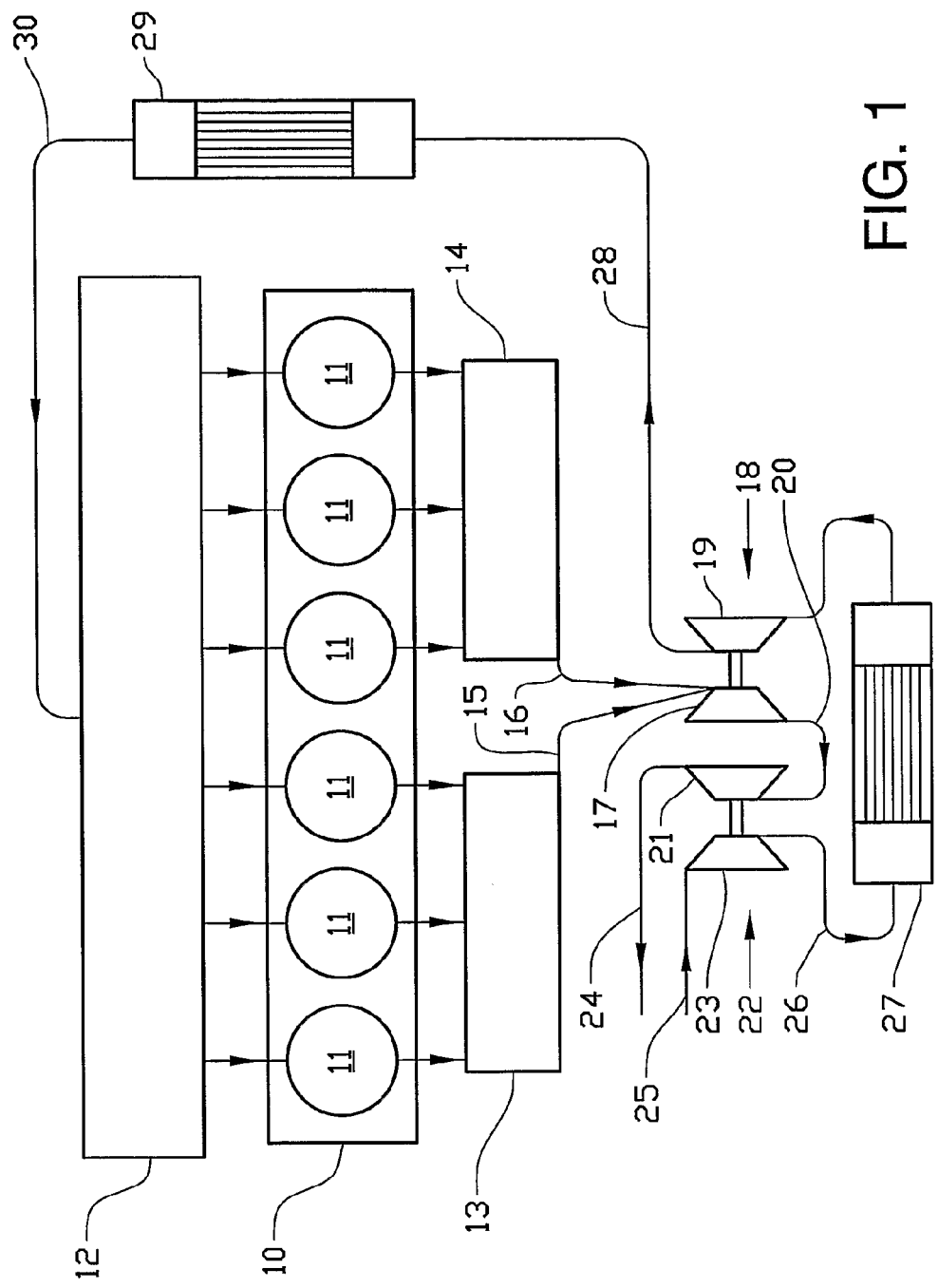
FIG. 1 shows diagrammatically an internal combustion engine having a two-stage turbocharger system according to the invention.

The invention relates to a supercharging system for, in the first place, diesel engines having a cubic capacity of between about 6 liters and about 20 liters, for use preferably in heavy-duty vehicles such as trucks, buses and construction machinery. The supercharging system has the characteristic that it offers a considerably more effective supercharge than current systems. The supercharge. is realized in two stages with two series-connected, radial-type compressors with intermediate cooling. The first compressor stage, referred to as the low-pressure compressor, is driven by a low-pressure turbine of the axial type. The second compressor stage, the high-pressure compressor, is driven by a high-pressure turbine of the radial type.

FIG. 1 shows an engine block 10 having six engine cylinders 11, which communicate in a conventional manner with an inlet manifold 12 and two separate exhaust manifolds 13, 14. Each of these two exhaust manifolds receives exhaust gases from three of the engine cylinders. The exhaust gases are led through separate pipes 15, 16 up to a turbine 17 in a high-pressure turbo unit 18, which comprises a compressor 19 mounted on a common shaft with the turbine 17.

The exhaust gases are led onward through a pipe 20 to a turbine 21 in a low-pressure turbo unit 22, which comprises a compressor 23 mounted on a common shaft with the turbine 21. The exhaust gases are finally led onward through a pipe 24 to the exhaust system of the engine, which can comprise units for the after-treatment of exhaust gases.

Filtered inlet air is admitted to the engine through the pipe 25 and led to the compressor 23 of the low-pressure turbo unit 22. A pipe 26 leads the inlet air onward through a first charge-air cooler 27 to the compressor 19 of the high-pressure turbo unit 18. After this two-stage supercharge with intermediate cooling, the inlet air is led onward through the pipe 28 to a second charge-air cooler 29, whereafter the inlet air reaches the inlet manifold 12 via the pipe 30.

The turbocharger system according to the invention is shown in greater detail in FIG. 2, which illustrates the double, spiral inlets 15, 16 to the high-pressure turbine 17, each of which provides half the turbine with gas flow via inlet guide rails 17a. The high-pressure turbine 17 is of the radial type and is connected to the low-pressure turbine 21 by the short intermediate duct 20, which is usable since the low-pressure turbine is of the axial type. his short flow path minimizes pressure losses between the turbine stages.

The high-pressure turbine 17 is mounted together with the high-pressure compressor 19 on the shaft 31. The low-pressure turbine 21 is correspondingly mounted together with the low-pressure compressor 23 on the shaft 32. The two turbo units 18, 22 are orientated along essentially the same longitudinal axis. The intermediate duct 20 is equipped with seals 33 that which combat installation tensions and leakage by allowing a certain mobility in the axial and radial directions to absorb thermal stresses and certain assembly (manufacturing) deficiencies.

The axial-type low-pressure turbine is provided with inlet guide rails 34, which are configured to optimize the work close to the center section of the turbine for maximum efficiency (so-called "compound lean" configuration with a guide rail in which the center of gravity of the profiles lie along a curved line, with a view to distributing the work in the turbine stage so that it is optimized toward the center of the turbine blade where marginal effects and losses are least). The low-pressure compressor is of the radial type with blades configured with a large back sweep, as will be described in greater detail below with reference to FIG. 3. The high-pressure compressor 19 is likewise of the radial type, the blades of which expediently are backswept in a corresponding manner to those in the low-pressure compressor 23.

It can be seen from FIG. 3 that a blade angle $\beta_{b2}$, between an imaginary extension of. the blade 35 along the centerline between root section and tip section in the direction of the outlet tangent and a line 36 (in dash-dot representation) connecting the center axis of the compressor wheel to the outer point of the blade, is at least about 40 degrees, expediently at least about 45-50 degrees. Turbo compressors available on the market have blade angles $\beta_{b2}$ between about 25 and about 35 degrees. In testing of a turbocharger system according to the invention, it has proved advantageous to increase the blade angle to at least about 40 degrees. The effect of this increase in blade angle consists primarily in the compressor wheel with associated turbine rotating at a higher speed for a given pressure ratio. The increase in speed means that the diameter, and hence also the mass moment of inertia, of the turbine wheel can be reduced. As a side effect of this, the transient response of the engine is also improved, since the reduced mass moment of inertia means that the turbine wheel can more easily accelerate to its effective speed range. In addition, the compressor efficiency increases, inter alia as a result of reduced velocity differential between the flow along the pressure side and suction side of the blade, leading to less secondary flow and hence lower losses, and as a result of a reduction in flow velocity in the rotor outlet, leading to lower losses in the following diffuser.

Both the compressors are provided with guide rails downstream of the respective compressor wheel in order to optimize the build-up of pressure. This diffuser is advantageously of the LSA (Low Solidity Airfoil) type, signifying a diffuser with aerodynamically configured blades whose length has a ratio to the distance between the blades (pitch) ranging between 0.75 and 1.5.

An outlet diffuser 37 is placed after the low-pressure turbine 21 in order to recover dynamic pressure leaving the turbine. The diffuser opens out into an exhaust collector 38, which guides the exhaust gases out to the exhaust pipe 24. The diffuser is designed as an annular duct with axial inlet and virtually radial outlet. The outer duct of the diffuser is closed off with a flange 37a in order to prevent the outflow from being disturbed by recirculating gases from the following collector. This flange 37a can be placed asymmetrically in order to reduce the size of the collector. The flange has its greatest radial height directly in front of the outlet of the exhaust collector 38 and its least radial height on the diametrically opposite side.

The high-pressure turbine 17 shown in FIG. 4, which drives the high-pressure compressor 19, is of the radial type, having a turbine wheel which, for. relatively high-speed rotation, is realized with small diameter. This makes it possible to avoid those kinds of recesses 39 in the turbine wheel hub 40 which are normally used in the prior art in turbines of this type (so-called "scalloping"). These recesses 39 are shown with dashed lines in FIG. 4, simply in order to illustrate the prior art. As a result of the elimination of these recesses, the turbine wheel is able to operate more effectively for a higher overall efficiency.

The turbines have inlet guide rails upstream of each wheel for optimal flow against the wheel. The arrangement comprising a radial-type high-pressure and axial-type low-pressure turbine means that flow losses between the turbine stages can be minimized by means of a short intermediate duct. The high-pressure turbine has been provided with a double feed worm in order to make optimal use of the energy in the exhaust gases from the diesel engine. The invention can also, however, be used in conventional inlets having single, double or multiple inlets.

In order to produce a pressure suitable for a diesel engine of 6 to 20 liters cubic capacity, about 4-6 bar absolute pressure, each compressor needs only to have a pressure increase of 2-2.5 times the inlet pressure and is therefore optimized for lower pressure ratios than normal single-stage compressors.

The turbocharger system which is described above can advantageously be applied to a four-stroke diesel engine with so-called Miller cam (fixed or adjustable), which means that some of the effective compression is moved outside the cylinder to the turbo compressors with subsequent cooling in the charge-air coolers, whereupon the temperature of the air volume is reduced, which produces a more effective thermodynamic process in the cylinder and lower exhaust emissions, for example nitrogen oxides (NOx).

The turbocharger system can also be used for engines with exhaust gas recirculation of the "Long Route EGR" type, i.e. in which exhaust gases can be removed after the outlet of the low-pressure turbine 21 and recirculated to the inlet side of the engine before the inlet of the low-pressure compressor.

The invention should not be considered limited to the illustrative embodiments described above, but rather a number of further variants and modifications are conceivable within the scope of the following patent claims. For example, the turbocharger system according to the invention is described in connection with a six-cylinder diesel engine, but the system is applicable to all the various piston engines from one cylinder and upwards and which are driven in a two-stroke or four-stroke cycle.

The invention can also be applied to marine engines and to engines with other cubic capacities than the aforementioned. An illustrative embodiment involving an axial-type low-pressure turbine has been described above, but the invention can also be used with a radial-type low-pressure turbine. Further-more, the high-pressure turbine 17 can be provided with fixed or geometrically rotatable inlet guide rails 17a.

What is claimed is:

1. A turbocharger system for an internal combustion engine (10) having at least one exhaust line (15, 16) for evacuating exhaust gases from the combustion chamber (11) of the engine and at least one inlet line (12) for supplying air to said combustion chamber, the turbocharger system includes a high-pressure turbine (17) interacting with a high-pressure compressor (19) and a low-pressure turbine (21) of the axial type interacting with a low-pressure compressor (23) for extracting energy from the exhaust flow of the engine and pressurizing the inlet air of the engine, both compressor stages are of the radial type and are provided with compressor wheels having backswept blades (35) in which the blade angle, ($\beta_2$), between an imaginary extension of the centerline of the blade between root section and tip section in the direction of the outlet tangent and a line (36) connecting the center axis of the compressor wheel to the outer point of the blade, is at least about 40 degrees, the high-pressure turbine (17) is of the radial type and is connected to the low-pressure turbine by an intermediate duct (20) and the low-pressure turbine (21) is provided with inlet guide rails (34) and wherein the high-pressure turbine (17) which drives the high-pressure compressor (19) is of the radial type, having a turbine wheel which has a small diameter and a recess-free hub.

2. turbocharger system as recited in claim 1, wherein the blade angle ($\beta_2$) is at least about 45 degrees.

3. The turbocharger system as recited in claim 1, wherein the blade angle ($\beta_2$) is at least about 50 degrees.

4. The turbocharger system as recited in claim 1, wherein the high-pressure turbine (17) is provided with a stator ring with fixed inlet guide rails.

5. The turbocharger system as recited in claim 1, wherein the high-pressure turbine (17) is provided with a stator ring with geometrically variable inlet guide rails.

6. The turbocharger system as recited in claim 1, wherein at least one of the compressors (19 and 23) is provided with a diffuser.

7. The turbocharger system as recited in claim 1, wherein the guide rail (34) of the axial turbine is compound-lean configured to optimize the work close to the center section of the turbine for maximum efficiency.

8. The turbocharger system as recited in claim 1, wherein the two compressor stages (19, 23) are flow-connected by a charge-air cooler (27).

9. The turbocharger system as recited in claim 1, wherein the intermediate duct (20) is annular and has an inner body (20a) having a cross section which increases in the direction downstream.

10. A turbocharger system for an internal combustion engine (10) having at least one exhaust line (15, 16) for evacuating exhaust gases from the combustion chamber (11) of the engine and at least one inlet line (12) for supplying air to said combustion chamber, the turbocharger system includes a high-pressure turbine (17) interacting with a high-pressure compressor (19) and a low-pressure turbine (21) interacting with a low-pressure compressor (23) for extracting energy from the exhaust flow of the engine and pressurizing the inlet air of the engine, both compressor stages are of the radial type and are provided with compressor wheels having backswept blades (35) in which the blade angle, ($\beta_2$), between an imaginary extension of the centerline of the blade between root section and tip section in the direction of the outlet tangent and a line (36) connecting the center axis of the compressor wheel to the outer point of the blade, is at least about 40 degrees, the high-pressure turbine (17) is of the radial type and is connected to the low-pressure turbine by an intermediate duct (20) and the low-pressure turbine (21) is provided with inlet guide rails (34) and further comprising an annular outlet diffuser (37) located downstream of the low-pressure turbine (21) for the recovery of kinetic energy from the gas flow, said outlet diffuser opening into an exhaust collector (38), wherein the outer wall of the outlet diffuser is closed off with a symmetrically placed flange (37a).

11. A turbocharger system for an internal combustion engine (10) having at least one exhaust line (15, 16) for evacuating exhaust gases from the combustion chamber (11) of the engine and at least one inlet line (12) for supplying air to said combustion chamber, the turbocharger system includes a high-pressure turbine (17) interacting with a high-pressure compressor (19) and a low-pressure turbine (21) interacting with a low-pressure compressor (23) for extracting energy from the exhaust flow of the engine and pressurizing the inlet air of the engine, both compressor stages are of the radial type and are provided with compressor wheels having backswept blades (35) in which the blade angle, ($\beta_2$) between an imaginary extension of the centerline of the blade between root section and tip section in the direction of the outlet tangent and a line (36) connecting the center axis of the compressor wheel to the outer point of the blade, is at least about 40 degrees, the high-pressure turbine (17) is of the radial type and is connected to the low-pressure turbine by an intermediate duct (20) and the low-pressure turbine (21) is provided with inlet guide rails (34) and further comprising an annular outlet diffuser (37) located downstream of the low-pressure turbine (21) for the recovery of kinetic energy from the gas flow, said outlet diffuser opening into an exhaust collector (38), wherein the outer wall of the outlet diffuser is closed off with an asymmetrically placed flange (37a) having its least radial extent diametrically opposite the outlet of the exhaust collector.

* * * * *